(12) United States Patent
Chatow et al.

(10) Patent No.: US 8,209,602 B2
(45) Date of Patent: Jun. 26, 2012

(54) VIEWING OF INTERNET CONTENT

(75) Inventors: Ehud Chatow, Palo Alto, CA (US); Andrew E. Fitzhugh, Menlo Park, CA (US); Andrew Bolwell, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1151 days.

(21) Appl. No.: 11/828,341

(22) Filed: Jul. 25, 2007

(65) Prior Publication Data
US 2009/0031214 A1 Jan. 29, 2009

(51) Int. Cl.
*G06F 17/00* (2006.01)
(52) U.S. Cl. ...................................... 715/255
(58) Field of Classification Search ............... 715/205, 715/255, 277, 200
See application file for complete search history.

(56) References Cited

U.S. PATENT DOCUMENTS

| | | | |
|---|---|---|---|
| 5,408,651 A * | 4/1995 | Flocken et al. ............. 714/19 |
| 5,761,662 A | 6/1998 | Dasan | |
| 6,026,417 A * | 2/2000 | Ross et al. ................. 715/210 |
| 6,029,182 A | 2/2000 | Nehab et al. | |
| 6,211,871 B1 * | 4/2001 | Himmel et al. ............. 715/744 |
| 6,460,036 B1 | 10/2002 | Herz | |
| 6,542,888 B2 * | 4/2003 | Marques ...................... 1/1 |
| 6,766,362 B1 | 7/2004 | Miyasaka et al. | |
| 6,850,988 B1 * | 2/2005 | Reed ........................ 709/238 |
| 6,938,073 B1 | 8/2005 | Mendhekar et al. | |
| 7,024,412 B1 * | 4/2006 | Webb et al. .................. 707/615 |
| 7,987,417 B2 * | 7/2011 | Chakrabarti et al. ......... 715/205 |
| 8,095,876 B1 * | 1/2012 | Verstak et al. .............. 715/273 |
| 8,122,346 B2 * | 2/2012 | Bezrukov et al. ............. 715/253 |
| 2002/0049727 A1 | 4/2002 | Rothkopf | |
| 2002/0077891 A1 * | 6/2002 | Castle et al. .................. 705/14 |
| 2002/0078036 A1 * | 6/2002 | Miller et al. .................. 707/3 |
| 2002/0078102 A1 * | 6/2002 | Dutta ........................ 707/526 |
| 2002/0111911 A1 * | 8/2002 | Kennedy et al. .............. 705/51 |
| 2002/0118382 A1 * | 8/2002 | Jackelen .................... 358/1.13 |
| 2002/0161603 A1 * | 10/2002 | Gonzales ...................... 705/1 |
| 2002/0188635 A1 * | 12/2002 | Larson ....................... 707/515 |
| 2003/0009489 A1 * | 1/2003 | Griffin ....................... 707/500 |
| 2003/0014445 A1 * | 1/2003 | Formanek et al. ............ 707/526 |
| 2003/0149725 A1 * | 8/2003 | Worthen .................... 709/204 |
| 2003/0220905 A1 * | 11/2003 | Amado et al. .................. 707/1 |
| 2004/0205596 A1 * | 10/2004 | Sequeira .................... 715/513 |
| 2004/0249939 A1 * | 12/2004 | Amini et al. ................. 709/225 |
| 2005/0055632 A1 * | 3/2005 | Schwartz et al. ............ 715/513 |
| 2005/0129262 A1 * | 6/2005 | Dillon et al. ................. 381/312 |
| 2005/0235201 A1 * | 10/2005 | Brown et al. ................ 715/517 |
| 2005/0262441 A1 * | 11/2005 | Yoon ......................... 715/526 |
| 2005/0278773 A1 * | 12/2005 | DeCinque et al. ............ 725/138 |
| 2006/0123334 A1 * | 6/2006 | Balasubramanyan et al. ......................... 715/513 |
| 2006/0168507 A1 * | 7/2006 | Hansen ...................... 715/500.1 |
| 2006/0206813 A1 * | 9/2006 | Kassan ....................... 715/530 |
| 2006/0215215 A1 | 9/2006 | Kumaran | |
| 2006/0218492 A1 * | 9/2006 | Andrade ..................... 715/523 |
| 2006/0268667 A1 * | 11/2006 | Jellison et al. .............. 369/30.08 |

(Continued)

OTHER PUBLICATIONS

Gallaugher et al., Revenue Streams and Digital Content Providers: an Empirical Investigation, Google 2001, pp. 473-485.*

(Continued)

*Primary Examiner* — Cong-Lac Huynh

(57) ABSTRACT

Different pieces of Internet content are manually selected during viewing on a screen, the selected pieces are arranged into a single publication, and the publication is sent to print.

21 Claims, 5 Drawing Sheets

U.S. PATENT DOCUMENTS

| | | | | |
|---|---|---|---|---|
| 2007/0073585 A1* | 3/2007 | Apple et al. | | 705/14 |
| 2007/0074111 A1* | 3/2007 | Firshein et al. | | 715/530 |
| 2007/0118797 A1* | 5/2007 | Layzell | | 715/517 |
| 2007/0130499 A1* | 6/2007 | Kim | | 715/500.1 |
| 2007/0198342 A1* | 8/2007 | Collison et al. | | 705/14 |
| 2007/0260671 A1* | 11/2007 | Harinstein et al. | | 709/203 |
| 2007/0265923 A1* | 11/2007 | Krassner et al. | | 705/14 |
| 2007/0291297 A1* | 12/2007 | Harmon et al. | | 358/1.15 |
| 2008/0109716 A1* | 5/2008 | Lee | | 715/254 |
| 2008/0184138 A1* | 7/2008 | Krzanowski et al. | | 715/760 |
| 2008/0282176 A1* | 11/2008 | Bates et al. | | 715/760 |
| 2008/0291471 A1* | 11/2008 | Uchida | | 358/1.6 |
| 2009/0157609 A1* | 6/2009 | Phan et al. | | 707/3 |
| 2009/0313265 A1* | 12/2009 | Sifry | | 707/10 |

OTHER PUBLICATIONS

Lam et al., A Model of Internet Consumer Satisfaction: Forcusing of the Web-site Design, Google 1999, pp. 1-4.*
Anupam et al., Personalizing the Web Using Site Description, IEEE 2002, pp. 1-7.*
Smith et al., Transcoding Internet Content for Heterogeneous Client Devices, IEEE 1998, pp. 1-4.*
Hanneghan et al., The Design of an Object-Oriented Repository to Support Concurrent Engineering, Google 1995, pp. 1-16.*
Smith et al., Transcoding Internet Content for Heterogeneous client devices, IEEE 1998, pp. 599-602.*
DE Office Action dated Jan. 24, 2012 iesued on DE Patent Application No. 112008001807.3 dated Jul. 16, 2008 by German Patent and Trade Mark Office.

* cited by examiner

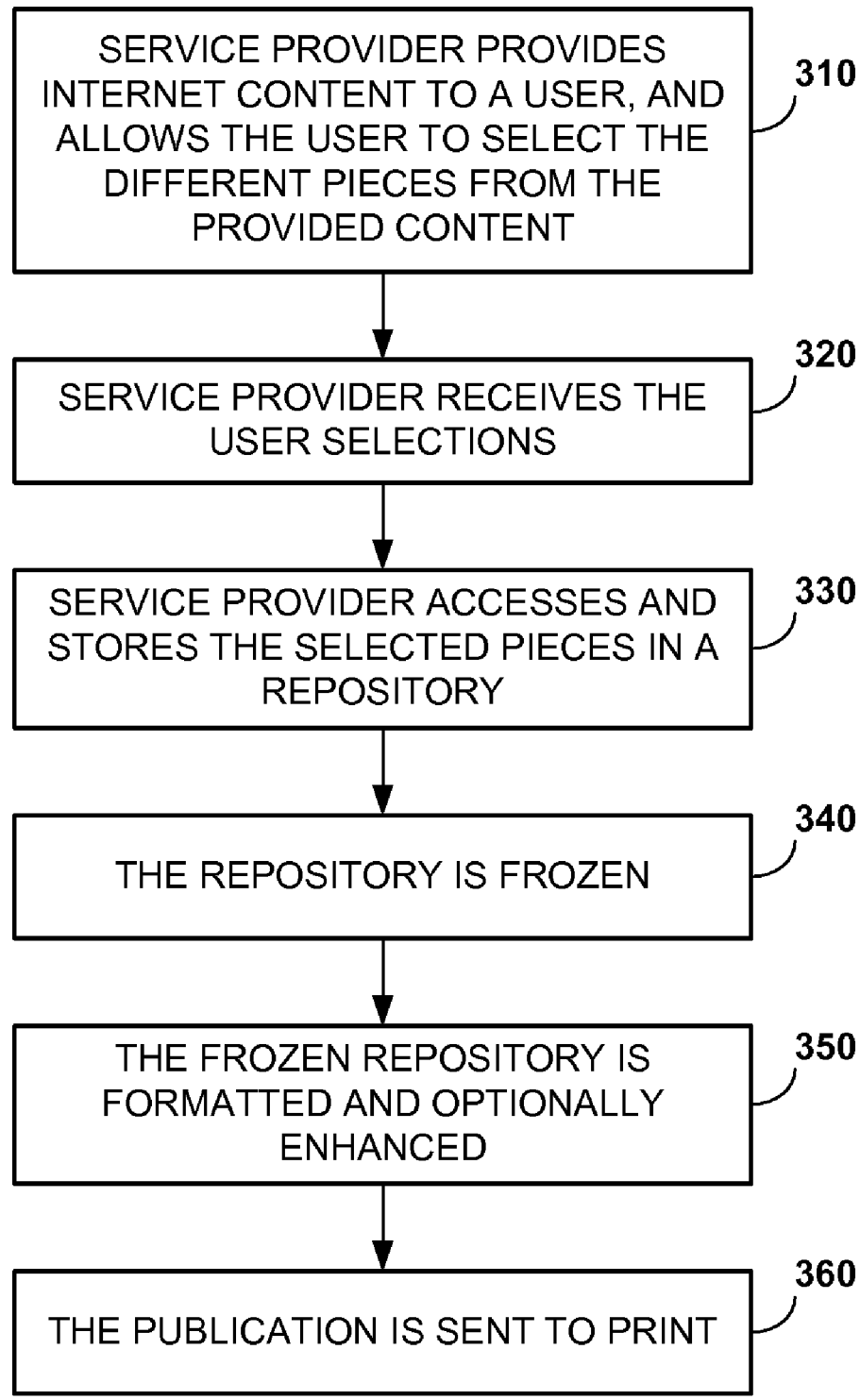

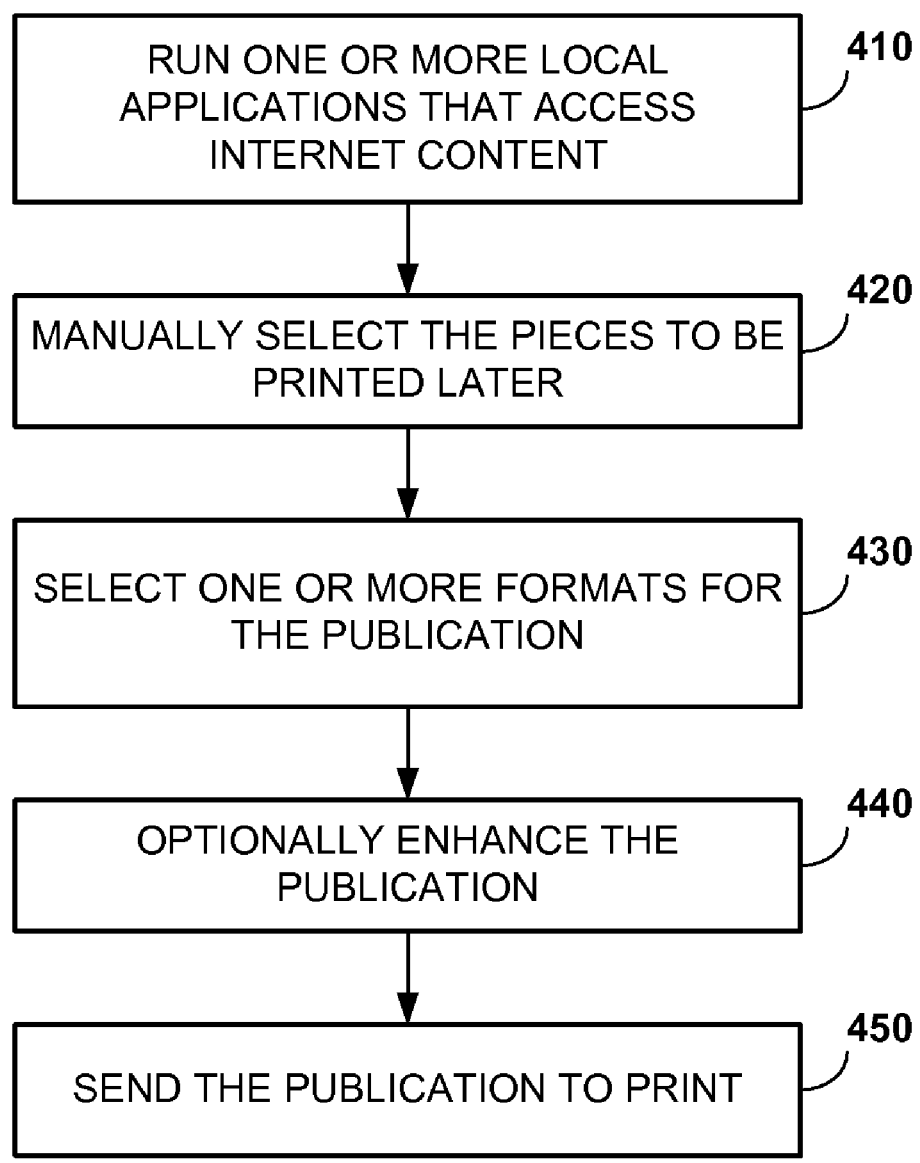

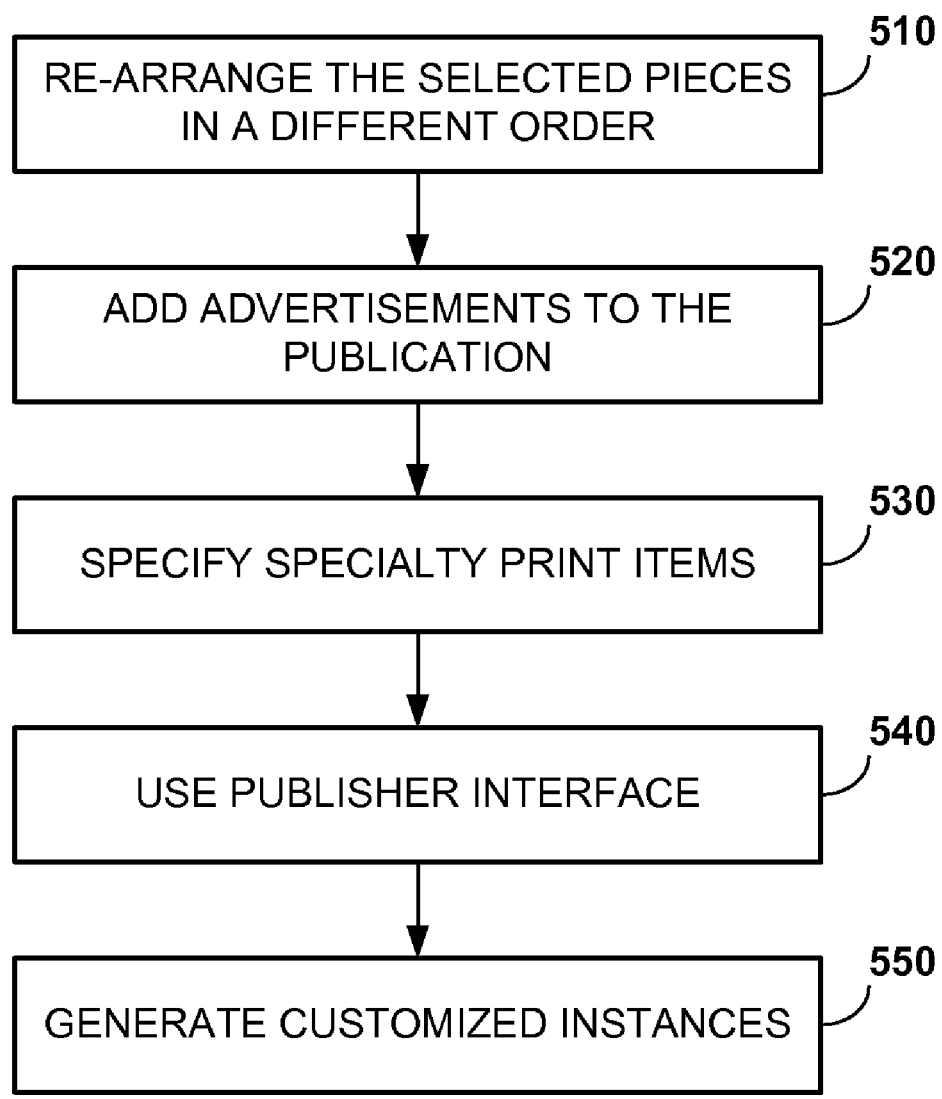

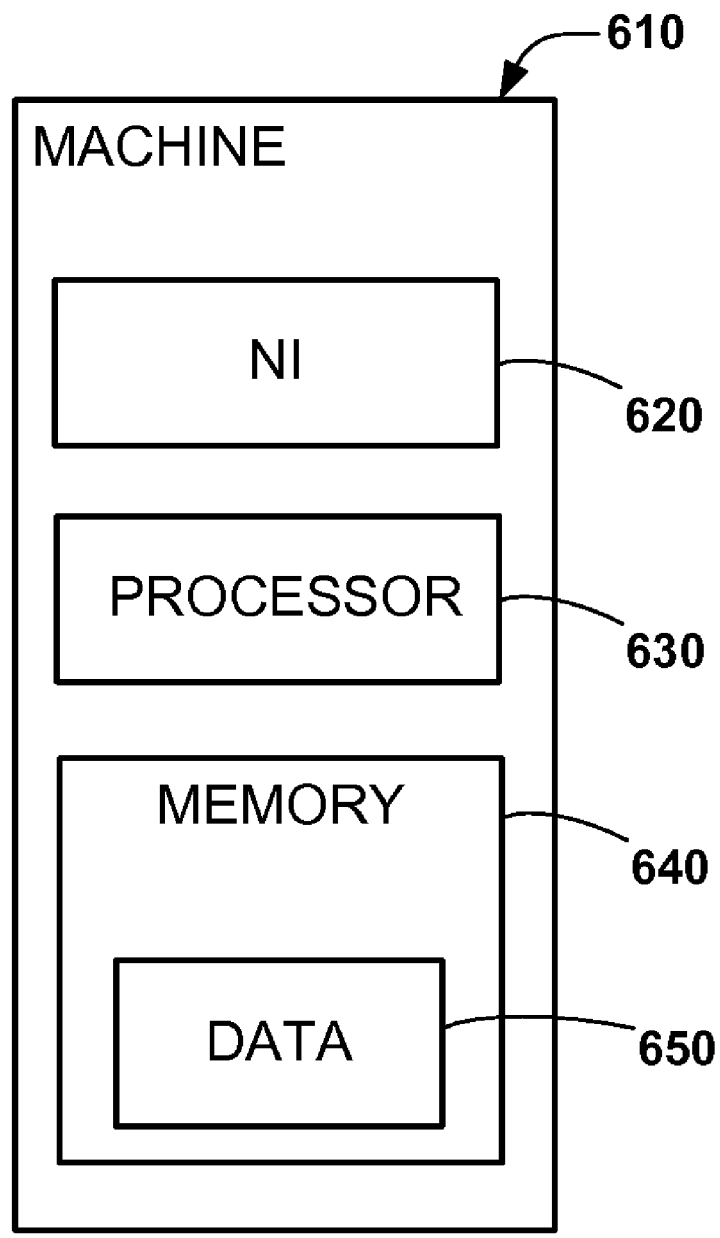

VIEWING OF INTERNET CONTENT

BACKGROUND

Internet viewing currently follows an on-line paradigm. Programs such as web browsers are used to access Internet content, and the content is displayed and viewed on a screen.

BRIEF DESCRIPTION OF THE DRAWINGS

FIGS. 2-4 are illustrations of a method in accordance with embodiments of the present invention.

FIG. 5 is an illustration of a method of enhancing a publication in accordance with an embodiment of the present invention.

FIG. 6 is an illustration of a machine in accordance with an embodiment of the present invention.

DETAILED DESCRIPTION

Figure 1:
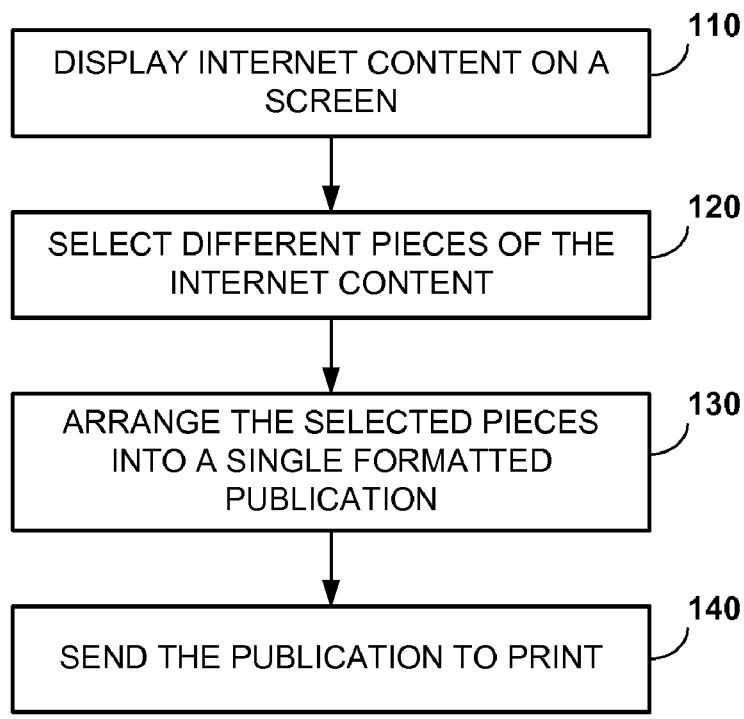
FIG. 1 is an illustration of a method of viewing Internet content in accordance with an embodiment of the present invention.

Reference is made to FIG. 1, which illustrates a method by which a person views Internet content. At block 110, the person runs at least one application (e.g., a web browser, a widget, a search engine or agent, a plug-in or other extension) that allows Internet content to be displayed on a screen. The screen may be, for example, a computer monitor, a television, a PDA or cell phone display, or the screen of any other device that can display Internet content.

The Internet content includes, but is not limited to, web pages, blog postings, and other resources that are addressable on the Internet. Different pieces of the Internet content include different web pages, different blog posts, etc. The different pieces may be displayed in full or in some abbreviated form (e.g., title, link, abstract). The pieces may be displayed on one or more pages, by one or more different applications.

The person might not have time to read all of the pieces while viewing them on the screen. In addition, the person might find it easier to read some of the pieces in printed format rather than on a screen.

The application that displays the Internet content may also be used to select different pieces of the content so those selected pieces can be viewed in a printed format. Or, a different application may be used to select the different pieces. The application that selects the different pieces will be referred to as the "selection" application. The selection application enables pieces to be selected, for example, by tagging checking, marking or otherwise selected their downloaded files or their links.

At block 120, the person uses the selection application to select different pieces of the Internet content. Pieces might be selected if the reader wants to read them, but doesn't have time, or if the pieces are easier to read in printed format, or some other reason.

At block 130, the selected pieces are arranged into a single formatted publication (the selection application can also arrange the selected pieces and format the arrangement). Selected pieces that have already been downloaded and cached can be converted to a standard document format (e.g., pdf or XML) and concatenated or otherwise arranged. Where links have been selected, the pieces at those links can be downloaded, converted, and arranged.

The publication is not limited to any particular type. Examples of different types of publications include, but are not limited to, personal magazines, personal catalogues, books, newsletters, and combinations thereof.

Arranging the selected pieces also includes placing the pieces in a format that is consistent with a certain type of publication. The resulting publication is not simply a concatenation of printed sheets. Rather, it is an arrangement of selected pieces that has the look and feel of a certain type of publication. As a first example, the publication contains only those articles that are of interest to a person, and it has the look and feel of a newspaper. As a second example, the publication contains articles and blog content that are of interest to a person, and it has the look and feel of a magazine. As a third example, the publication contains a document that someone would prefer to read and review in printed format instead of on a screen. The document can be formatted to have the look and feel of a professional report. As a forth example, a publication contains both news articles and documents. The news articles are formatted to have the look and feel of a newspaper, and the documents are formatted to have the look and feel of professional reports.

At block 140, the publication is sent to print. The publication can be sent to a local printer, or the publication can be sent for printing to another party, such as a print service provider (PSP). The PSP could print the publication and deliver it to a specified location.

The method of FIG. 1 shifts Internet viewing from an on-line paradigm to a print paradigm. The print paradigm offers advantages over the on-line paradigm For instance, multiple pages are usually easier and faster to read and digest in a printed format.

In addition, the print paradigm is not tethered to an Internet connection. Via a print paradigm, a person can read Internet content at locations that do not offer Internet access.

Figure 2:
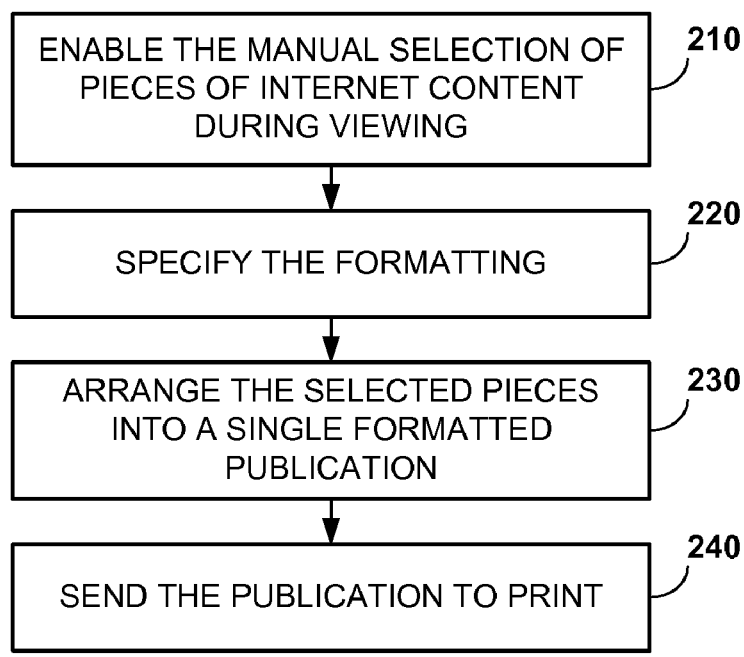

Reference is now made to FIG. 2, which illustrates a general method for realizing the print paradigm. The method may be performed by a selection program.

At block 210, a person is enabled to manually select different pieces of Internet content during viewing (e.g., by a selection program). As a first example, the person uses a search engine or agent to return a list of titles, The search engine then allows the person to select those titles to be printed later. As a second example, the person uses a web browser to download different web pages and RSS feeds. The web browser then allows the person to select those pages and portions of RSS feeds to be printed later.

At block 220, the type of formatting for the publication is specified. A single format for the entire publication may be selected, different formats for different sections of a publication may be selected, etc.

At block 230, all selected pieces are arranged into a single formatted publication. At block 240, the publication is sent to print.

Reference is now made to FIG. 3, which illustrates a method performed by a central service provider. Consider a service provider such as Google or Yahoo. Each company provides various services for providing Internet content. For instance, Google offers its search engine and Google Reader, which checks favorite web sites, news sites and blogs for new content. Yahoo offers its search engine and MyYahoo!, which provides personalized web content (TV listings, bookmarks to other web sites, links to selected newspaper articles, links to stock market information, etc.). A user (e.g., a person) can access these services via the service providers' web sites.

At block 310, a service provider provides Internet content to a user, and allows the user to select the different pieces from the provided content. For instance, the service provider uploads a web page containing search results or links to content. A checkbox could be placed next to the items to allow the user to select those items that will be printed later. Or social bookmarking could be used to select those items that will be printed later (lists of useful Internet resources are accessed via a specific network or website).

At block 320, the service provider receives the user selections. At block 330, the service provider accesses the selected pieces (e.g., downloads certain pieces, copies certain pieces that have been cached) and stores the selected pieces in a repository (e.g., in server-accessible memory).

At block 340, the repository is "frozen" (that is, no more selected pieces are added). The repository may be frozen when requested by a user. For instance, if a user has to catch a flight the next day, that user might want the repository frozen immediately so a publication can be created and delivered to the airline (which can then deliver the publication to the user at the gate or on the plane).

Alternatively, the repository may be frozen according to a user-defined custom schedule. For instance, publication creation can be scheduled periodically (e.g., weekly, monthly), or according to an ad-hoc special print schedule, or whenever the repository has been filled with a predefined number pages (e.g., once a page limit for the publication has been reached).

The user-defined schedule could be performed as part of a subscription service. For instance, the user pays a certain amount of money for X number of pages. The cost of the service could be subsidized in part or in full by allowing a certain amount of advertising.

At block 350, the frozen repository is formatted to have the look and feel of a specified type of publication. The publication can also be enhanced. Examples of enhancing a publication will be described below.

At block 360, the on-line service provider sends the publication to print. The service provider can print the publication and send it (e.g., by mail, fax) to the user. Or, the service provider can send the publication in electronic form to a print service provider, which prints out the publication and sends the printed publication to the user. As a first example, the on-line service provider e-mails the printed publication to a print shop, where the user later picks it up. As a second example, the service provider e-mails the publication to a hotel at which the user is (or will be) staying. The hotel then prints the publication and gives it to the user. As a third example, the on-line service provider e-mails the publication to the user, who prints it on a local printer.

In the method of FIG. 3, the repository may be partitioned, where each partition contains a different type of content (e.g., pictures, news articles, sports). The content in the different partitions can be formatted differently. For example, a first print template could be applied to news content, a second print template could be applied to sports, and so on. The formatted content is then combined into a single publication. Instead of partitioning a single repository, different repositories may be used.

Reference is now made to FIG. 4, which illustrates a method performed by a user. At block 410, the user runs one or more local applications (e.g., a web browser, a search engine, a widget) that access Internet content.

At block 420, the user uses a selection application to manually select the pieces to be printed later. A piece could be stored as soon as it is selected, or it could be stored after all selections have been made, or any time therebetween. If a link or bookmark is selected, the piece at that link or bookmark is downloaded and stored.

At block 430, the user specifies one or more formats for the publication. At block 440, the user specifies enhancements for the publication. Examples of enhancing a publication will be described below.

At block 450, the publication is sent to print. The publication could be sent to a local printer or to a PSP.

Reference is now made to FIG. 5, which illustrates various ways in which a publication can be enhanced prior to being sent to print. All of the ways illustrated in FIG. 5 are optional and can be performed in any order.

At block 510, the pieces that have been selected and arranged can be re-arranged in a different order. This re-arrangement can be performed by the user.

At block 520, one or more advertisements can be added to the publication. The advertisements can be added to partially or fully subsidize the cost of preparing the publication.

At block 530, specialty print items can be specified. As examples, a certain print media type or color properties (e.g., CMYK, CMYKcm, hexachrome or larger gamut) might be specified. Other specialty services, such as applying bindings, special finishes, etc., might be specified. A PSP capable of fulfilling the specified print options (and other criteria, such as cost) would then be selected.

At block 540, the publication can be enhanced by using a Publisher Interface. As used herein, a Publisher Interface refers to an embodiment of the platform disclosed in assignee's U.S. Ser. No. 11/741,718 filed 27 Apr. 2007, which is incorporated herein by reference. The Publisher Interface provides access to a wide variety of resources (e.g., content providers, designers, advertisers, editors, print service providers) of varying degrees of quality. A person with little or no knowledge of desktop publishing can enlist selected parties to create a professional-looking publication. A publisher doesn't need to understand the intricacies of document publishing. A publisher doesn't need to establish a network of content providers, designers, advertisers. The Publishing Interface could incorporate a method according to an embodiment of the present invention.

At block 550, the enhancing includes using the arranged pieces as common content, and generating customized instances from the common content. Thus, the arranged pieces may be included in each instance. However, the different instances may also include additional content that is different. Examples of the additional content include, but are not limited to, jokes, quotes, and reviews. The different instances may also include different advertisements, and different designs (applying a theme, higher quality templates, art work), and any other customized material.

The instances may be customized according to recipient interests. Recipient interests might include geographic location, reading interests, hobbies, affiliations, memberships, desired level of advertising, etc. An instance may contain customized content (e.g., stories of interest, regional information, certain editorials, photos from specific places of interest to a recipient). An instance may contain a customized design (e.g., an appropriate template or style sheet, a theme for special occasion, a layout with cartographic styles for a recipient interested in travel, use of a predominant color for a holiday, certain image borders or frames, fonts, page numbers and other graphical elements). Customizing instances of a publication is described in assignee's U.S. Ser. No. 11/694,914 filed 30 Mar. 2007, which is incorporated by reference. The Publisher Interface could be used to perform the customization.

Advertisements in an instance may also be customized according to a recipient's interests. Customization of advertisements is described in assignee's U.S. Ser. No. 11/460,488 filed Jul. 27, 2006, which is incorporated by reference.

Customization of advertising has particular advantages. For example, a recipient might be willing to pay full cost for an instance, provided that the instance does not contain advertising. Or a recipient might accept a certain amount of advertising in an instance so that the instance is subsidized in part by advertisements. As a result, the recipient's cost of the instance would be reduced.

Formatting may be performed, before, during or after the enhancements are applied. Formatting includes giving the publication a certain look and feel. The publication may be formatted with predefined templates and page masters that are pre-defined. The templates and page master could be user-supplied.

Formatting could also include fitting the pieces and any other material (e.g., advertisements, other personalized content, and filler content) to the length of a page. In general, the formatting can include improving the appearance, organization and readability of a publication.

Reference is made to FIG. 6, which illustrates a general hardware implementation of a method according to an embodiment of the present invention. The hardware implementation includes a machine 610 having a network interface 620, a processor 630, and memory 640. The memory 640 includes data 650 (e.g., code) for causing the processor 630 to perform a method according to an embodiment of the present invention. The actual implementation will depend upon whether the method is performed locally or by an on-line service provider. For instance, if a method according to an embodiment of the present invention is performed by an on-line service provider, the machine could be part of a server system. If a method according to an embodiment of the present invention is performed locally, the machine could include a personal computer.

The invention claimed is:

1. A method, comprising:
   facilitating viewing of different pieces of Internet content via an Internet access application;
   facilitating manual selection of the different pieces of Internet content during viewing via a selection application;
   accessing and storing selected pieces of Internet content after the selected pieces of Internet content have been selected;
   arranging the selected pieces of Internet content into a single publication;
   storing the selected pieces of Internet content in a repository;
   filling the repository until a page limit of the repository is reached and then freezing the repository;
   dividing the repository into partitions such that each partition contains a different type of content;
   formatting the publication with pre-defined templates and page masters based on the partitions and the type of content in each partition; and
   sending the publication to print.

2. The method of claim 1, further comprising providing the Internet content.

3. The method of claim 2, wherein an on-line service provider provides a service for enabling the different pieces of Internet content to be selected.

4. The method of claim 1, wherein the repository is frozen according to a schedule.

5. The method of claim 1, further comprising displaying the Internet content on a screen.

6. The method of claim 1, further comprising printing the publication on a local printer.

7. The method of claim 1, wherein sending the publication to print includes selecting a print service provider.

8. A method comprising:
   facilitating viewing of different pieces of Internet content via an Internet access application;
   facilitating manual selection of the different pieces of Internet content during viewing via a selection application;
   accessing and storing selected pieces of Internet content after the selected pieces of Internet content have been selected;
   arranging the selected pieces of Internet content into a single publication;
   storing the selected pieces of Internet content in a repository; and
   filling the repository until a page limit of the repository is reached and then freezing the repository.

9. The method of claim 8, wherein the Internet access application and the selection application each comprise a local application.

10. The method of claim 8, further comprising sending the publication to print.

11. The method of claim 10, further comprising enhancing the publication before sending it to print.

12. The method of claim 11, wherein the enhancing includes re-arranging the selected pieces in a different order.

13. The method of claim 11, wherein the enhancing includes using a Publisher Interface.

14. The method of claim 11, wherein the enhancing includes adding additional content to the publication.

15. The method of claim 11, wherein the enhancing includes adding advertising to the publication to subsidize the cost of the publication.

16. The method of claim 11, wherein the enhancing includes using the arranged pieces as common content; and generating customized instances from the common content.

17. The method of claim 16, wherein the customized instances are respectively based upon a recipient's interests.

18. The method of claim 10 wherein a destination to which the publication is sent for printing is based upon a user.

19. The method of claim 8, further comprising selecting a format for the publication, the format being based upon the Internet content and being selected from a newspaper, a magazine, a professional report, a catalogue, a book, a newsletter, or combinations thereof.

20. The method of claim 8, further comprising selecting a print option from a media type for the publication to be printed on, a color property of the publication, or combinations thereof.

21. The method of claim 20, further comprising selecting a print service provider based upon print options that are selected.

* * * * *